United States Patent Office 3,493,614
Patented Feb. 3, 1970

3,493,614
O-ACRYLYL- AND O-METHACRYLYL
AMIDOXIMES
Pier Luigi Pacini, Dobbs Ferry, N.Y., assignor to Geigy
Chemical Corporation, Ardsley, N.Y., a corporation of
Delaware
No Drawing. Filed Oct. 17, 1966, Ser. No. 586,989
Int. Cl. C07c 123/00
U.S. Cl. 260—564  9 Claims

ABSTRACT OF THE DISCLOSURE

Monomer compounds having the formula:

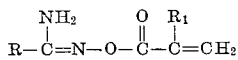

wherein R is $O_nX_{2n+1}$, monocarbocyclic aryl or alkyl-monocarbocyclic aryl; $n$ is a whole number of from 1 to 18; X is hydrogen or fluorine; $R_1$ is hydrogen or methyl; and acid-addition salts thereof, the $C_nX_{2n+1}$ radical being straight or branched chain, are useful to prepare polymers which have utility as dyesites for acidic, direct or metallized dyes, for the protection and stabilization of organic substrates against deterioration due to ultraviolet light, and for polymers which contain fluorine provide oil- and water-repellent finishes useful in treating materials such as textiles, paper, leather, painted wooden and metallic surfaces.

---

This invention relates to novel monomers useful to prepare polymers. More particularly it relates to O-acrylyl- and O-methacrylyl-amidoximes and salts thereof. The new fluorine-containing monomers provide polymers with oil- and water-repellent properties useful to treat materials such as textiles, paper, leather, painted wooden and metallic surfaces, and the like. In addition, all of the monomers are useful to prepare polymers of utility as dyesites for acidic dyestuffs. And the polymers have been found to be useful as stabilizers to deterioration caused in many organic materials by ultraviolet light.

The compounds contemplated by the instant invention are selected from those of the formula:

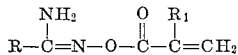

wherein R is $C_nX_{2n+1}$, monocarbocyclic aryl or alkyl-monocarbocyclic aryl; $n$ is a whole number of from 1 to 18; X is hydrogen of fluorine; $R_1$ is hydrogen or methyl; and acid-addition salts thereof. The $C_nX_{2n+1}$ radical may be straight or branched chain.

Special mention is made of an especially valuable embodiment of this invention. This comprises compounds of the formula above wherein R is $C_nX_{2n+1}$ and X is fluorine. Polymers obtained from these new monomers are characterized by excellent resistance to hydrolysis. This provides substantial advantage in their use as fabric finishes, when compared to finishes previously used for the purpose of soil repellency. Fabrics finished with polymers made from these fluorine-containing monomers retain their soil-repellent properties after repeated washing.

Especially useful as embodiments of this invention are the compounds O-methacrylyl perfluorooctanamidoxime, a compound of the above formula in which R is $C_nX_{2n+1}$, $n$ is 7, X is fluorine and $R_1$ is methyl; O-methacrylyl perfluorobutyramidoxime, a compound of the above formula wherein R is $C_nX_{2n+1}$, $n$ is 3, X is fluorine and $R_1$ is methyl; O-methacrylyl acetamidoxime, a compound of the above formula wherein R is $C_nX_{2n+1}$, $n$ is 1, X is hydrogen and $R_1$ is methyl; O-methacrylyl benzamidoxime, a compound of the above formula wherein R is phenyl and $R_1$ is methyl; and O-methacrylyl propionamidoxime, a compound of the above formula wherein R is $C_nX_{2n+1}$, $n$ is 2, X is hydrogen and $R_1$ is methyl, and the hydrochloric acid-addition salt thereof. The term "acrylyl" when used herein and in the appended claims contemplates as well "methacrylyl." The term "polymers" includes homopolymers and copolymers. The term "monocarbocyclic aryl" contemplates phenyl or phenyl substituted with from 1 to 5 and preferably from 1 to 3 of the following: fluoro, chloro, bromo, iodo, trifluoromethyl, alkoxy of from 1 to 6 carbon atoms, alkyl of from 1 to 6 carbon atoms or phenyl.

The instant amidoximes are amphoteric substances, soluble in dilute mineral acids as well as aqueous alkaline solutions. The amino group in the molecule confers basic properties to the amidoximes. Salts of the instant amidoximes with mineral or organic acids are within the scope of this invention. Illustrative of acids forming the instant acid-addition salts are: hydrochloric, hydrobromic, sulfuric, phosphoric, nitric, methane sulfonic, acetic, lactic, succinic, malic, maleic, aconitic, phthalic, tartaric, and the like.

The O-acrylyl- and methacrylyl-amidoximes of this invention form copolymers with many monomers containing an ethylenic linkage. Illustrative of such comonomers are butadiene, chloroprene, 1,1,2-trifluoro-1,3-butadiene, octyl acrylate, dodecyl methacrylate, vinyl chloride, and the like. Especially useful to form soil-repellent finishes are copolymers of methacrylyl perfluorooctanamidoxime and alkyl methacrylates.

The new compounds can be prepared from readily available materials according to the reaction outlined in the following sequence:

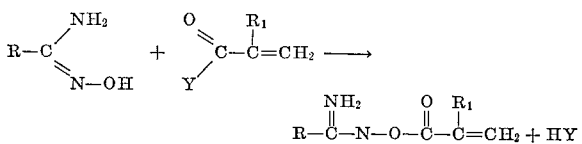

wherein $n$, R, and $R_1$ are as above defined and Y is halogen, such as chlorine or bromine. The condensation is effected merely by bringing together the amidoxime and the acrylyl or substituted acrylyl halide. It is preferred to conduct the reaction in a solvent, suitably dry acetonitrile, and to stir the reaction mixture for from about 1 hour to about 12 hours at a temperature of from about 25° C. to about 85° C. to insure highest yields. The product is recovered by evaporating the solvent, when X is F; and by treating with water, neutralizing with a weak base and extracting the product with a water-immiscible organic solvent when X is hydrogen. The product which remains as a residue, can be purified, if desired, by recrystallization from a hydrocarbon solvent such as petroleum ether mixed with a ketone, such as acetone or an ester, such as ethyl acetate.

The starting materials are readily available or can be prepared by techniques within the capabilities of those skilled in the art. Alkylamidoximes and salts, for example, can be prepared by simple modifications of the procedures reviewed by Eloy and Lenaers in Chem. Reviews, 62, 155 (1962). Perfluoroalkyl analogs thereof are described by Brown and Wetzel in J. Org. Chem 30 3734 (1965). The acrylyl and methacrylyl halides are items of commerce or can be obtained, for example, by the procedures described in the literature of the art to which the present invention pertains.

The starting materials can be prepared, for example, by mixing, in an alcoholic solvent, an appropriate nitrile with free hydroxylamine (which can be generated from its hydrochloride in methanol by the addition of equivalent amounts of an alcoholic solution of sodium methoxide). The mixture is stirred until addition of the hydroxylamino group is substantially complete, which requires from about 30 minutes to about 4 days, depending on the reactivity of the reagents and the temperature of the mixture. With perfluoro-nitriles, which are somewhat more reactive, a temperature of about 25° C. is used; less reactive nitriles are converted at somewhat higher temperatures, e.g. about 50° C. The starting material is recovered by filtering of the by-product salt, then removing the solvent by distillation. Purification, if desired, is accomplished by recrystallization from chloroform or carbon tetrachloride, or by distillation under reduced pressure.

Homopolymers and copolymers of the instant monomers are formed by standard procedures well known to those skilled in the art. Polymerization occurs readily by bulk, solution or emulsion techniques, employing free radical-forming catalysts. The ratios of percentages by weight of the respective monomers used can vary widely in the formation of useful copolymers. For example, charge ratios of the instant acrylyl amidoxime monomers may vary from 1 to 99% by weight of the total monomer mixture. It is preferred however, for the best balance of economy and ultimate properties, to use between about 40 and about 90% by weight of the instant monomers based on the total monomer mixture. Suitable techniques for preparing especially useful copolymers from the instant monomers are derived from and substantially the same as those shown in Bolstad, Sherman and Smith, U.S. 3,068,187.

Films of the homopolymers and copolymers can be prepared by casting from solvent solutions. Especially useful as solvents for the polyacrylyl perfluoroalkanamidoximes, are fluorinated liquids, and special mention is made of $\alpha,\alpha,\alpha$-trifluorotoluene, also known as benzotrifluoride.

It is also uniquely advantageous, especially in the preparation of fabric finishes, to use blends of homopolymers of the instant perfluoroalkyl monomers with other homopolymers such as alkyl acrylates and alkyl methacrylates, illustrative of which is n-octylmethacrylate. Since the homopolymers of certain of the acrylyl perfluoroalkanamidoximes have a tendency to be brittle and high melting, blending them with, for example, from about 20 to about 97% by weight of a homopolymer such as poly-n-octyl methacrylate provides useful compositions which, surprisingly, retain high repellency ratings even though the relative amount of the polymer of the instant monomers is quite low.

The following examples are illustrative of the compounds of the instant invention. They are not to be construed to limit the claims in any manner whatsoever.

EXAMPLE I

O-methacrylyl perfluorooctanamidoxime

Perfluorooctanamidoxime (prepared according to H.C. Brown and C. R. Wetzel, J. Org. Chem. 30, 3734 (1965); 27 g., 0.063 mole) is finely pulverized and suspended in dry acetonitrile (140 ml.) A solution of methacrylyl chloride (6.6 g., 0.063 mole) in 14 ml. of dry acetonitrile is added to the suspension dropwise at room temperature with vigorous stirring. The mixture is stirred for two hours at room temperature and then refluxed for two additional hours. Removal of the solvent under reduced pressure leaves a crystalline product, which after crystallization from acetone-hexane affords 27 g. (86%) of O-methacrylyl perfluorooctanamidoxime, M.P. 132.5–137° C.

The NMR spectrum (acetone=$d_6$) shows a doublet at 2.00 $\delta$ ($CH_3$), two multiplets at 5.71 and 6.24 for the vinylic protons and a broad signal at 6.97 for the —$NH_2$—. The infrared spectrum has absorptions at 2.8–3.0$\mu$ ($NH_2$), 5.75 (C=O), 6.0 (C=N) and 6.2 (C=C).

*Analysis.*—Calcd. for $C_{12}F_{19}H_7N_2O_2$: C, 29.04; H, 1.42. Found: C, 29.24; H, 1.36.

EXAMPLE II

O-methacrylyl perfluorobutyramidoxime

Perfluorobutyramidoxime (13.1 g., 0.061 mole) is dissolved in dry acetonitrile (50 ml.). Methacrylyl chloride (6.37 g., 0.061 mole) in 10 ml. of acetonitrile is then added dropwise at room temperature with vigorous stirring. The mixture is stirred three hours at room temperature and then the volatile material removed under vacuum. The solid product is crystallized from benzene to afford 4.5 g. of O-methacrylyl perfluorobutyramidoxime, M.P. 109–110° C. The NMR and infrared spectrums conform to the indicated structure.

EXAMPLE III

O-methacrylyl acetamidoxime

Acetamidoxime (prepared according to R. Lenaers, C. Moussebois and F. Eloy, Helv. Chim. Acta, 15, 441 (1962); 14.8 g., 0.2 mole) is suspended in 50 ml. of dry acetonitrile. A solution of methacrylyl chloride (20.9 g., 0.2 mole) in 30 ml. of dry acetonitrile is then added dropwise with vigorous stirring at room temperature. The mixture is stirred twelve hours at room temperature and then poured in ice-water; the water solution is neutralized with saturated solution of sodium bicarbonate and extracted with chloroform. The chloroform extract is dried over sodium sulfate, filtered and the solvent is removed under vacuum. The solid residue is crystallized from ethyl acetate-petroleum ether to afford 9.5 g. of product M.P. 80–82.5° C.

The NMR spectrum shows a singlet at 2.00 $\delta$ (two methyls), a broad signal at 5.14 for the $NH_2$ and two multiplets at 5.37 and 6.10 for the vinylic protons. An infrared spectrum confirms the indicated structure.

EXAMPLE IV

O-methacrylyl benzamidoxime

This compound is prepared from benzamidoxime (prepared according to F. Tiemann and P. Kruger, Ber., 17, 1685 [1884]) and methacrylyl chloride following the same procedure for the methyl analogs with the difference that the reaction mixture is worked up after four hours at room temperature. The yield is 95% and the product melts at 115–116° C. (from ethyl acetate-petroleum ether).

EXAMPLE V

O-methacrylyl propionamidoxime hydrochloride

Propionamidoxime (prepared according to E. Nordmann, Ber., 17, 2746 [1884] 20 g.) and methacrylic chloride (23. g.) are allowed to react in acetonitrile (80 ml.) for one hour at room temperature. The salt which precipitates almost immediately is filtered and dried to afford 36.1 grams of product, M.P. 165° C. (dec.).

EXAMPLE VI

O-methacrylyl propionamidoxime

The hydrochloride of Example V (5 g.) is dissolved in 20 ml. of water and the solution is neutralized with saturated solution of sodium bicarbonate. Then it is extracted with chloroform; the chloroform extract is dried, filtered and the solvent is removed from the filtrate under vacuum. The solid product (3.8 g.) is crystallized from ethylacetate-petroleum ether. M.P. 71–73° C.

EXAMPLE VII

The procedure of Example I is repeated with stoichiometrically-equivalent amounts of alkyl-, aryl- or perfluoroalkylamidoximes and acrylyl and methacrylyl halides.

The following substituted acrylylamidoximes are obtained:

$$R-\underset{\underset{NH_2}{|}}{C}=N-O-\underset{\underset{}{\overset{O}{\|}}}{C}-\underset{\underset{R_1}{|}}{C}=CH_2$$

| R | $R_1$ |
|---|---|
| $CF_3$ | $CH_3$ |
| $(CF_3)_2CF$ | H |
| $CF_3(CF_2)_6$ | $CH_3$ |
| $CF_3(CF_2)_{17}$ | $CH_3$ |
| $CF_3(CF_2)_{11}$ | $CH_3$ |
| $CF_3(CF_2)_{10}$ | H |
| $CF_3(CF_2)_{10}$ | $CH_3$ |
| $CF_3(CF_2)_8$ | H |
| $(CF_3)_2CF(CF_2)_6$ | $CH_3$ |
| $(CF_3)_2CF[CF_2CF(CF_3)]_4$ | $CH_3$ |
| $CF_3[CF_2CF(CF_3)]_5$ | $CH_3$ |
| $(CH_3)_2CH$ | H |
| $CH_3(CH_2)_6$ | $CH_3$ |
| $CH_3(CH_2)_{17}$ | $CH_3$ |
| $CH_3(CH_2)_{11}$ | $CH_3$ |
| $(CH_3)_2CH(CH_2)_6$ | $CH_3$ |
| $(CH_3)_2CH[CH_2CH(CH_3)]_4$ | $CH_3$ |
| $CH_3[CH_2CH(CH_3)]_5$ | $CH_3$ |
| F—⟨phenyl⟩— | $CH_3$ |
| Cl—⟨phenyl⟩— | $CH_3$ |
| Br—⟨phenyl⟩— | $CH_3$ |
| $CH_3$—⟨phenyl⟩— | $CH_3$ |
| $CF_3$—⟨phenyl⟩— | $CH_3$ |
| $CH_3CONH$—⟨phenyl⟩— | $CH_3$ |
| $CH_3O$—⟨phenyl⟩— | $CH_3$ |
| ⟨phenyl⟩—$CH_2$ | $CH_3$ |
| biphenyl—$CH_2$— | $CH_3$ |

What is claimed is:
1. A compound selected from those of the formula:

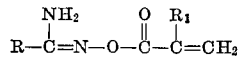

wherein
R is $C_nX_{2n+1}$, phenyl, or phenyl substituted with from 1 to 3 substituents selected from fluoro, chloro, bromo, iodo, trifluoromethyl, alkoxy of 1 to 6 carbon atoms, alkyl of 1 to 6 carbon atoms, or phenyl;
n is a whole number of from 1 to 18;
X is hydrogen or fluorine;
$R_1$ is hydrogen or methyl;
and acid-addition salts thereof.

2. A compound as defined in claim 1 wherein R is $C_nX_{2n+1}$ and X is fluorine and $R_1$ is methyl.

3. A compound as defined in claim 1 wherein R is $C_nX_{2n+1}$ and X is hydrogen and $R_1$ is methyl.

4. A compound as defined in claim 1 wherein R is $C_nX_{2n+1}$, n is 7, X is fluorine and $R_1$ is methyl.

5. A compound as defined in claim 1 wherein R is $C_nX_{2n+1}$, n is 3, X is fluorine and $R_1$ is methyl.

6. A compound as defined in claim 1 wherein R is $C_nX_{2n+1}$, n is 1, X is hydrogen and $R_1$ is methyl.

7. A compound as defined in claim 1 wherein R is phenyl and $R_1$ is methyl.

8. A compound as defined in claim 1 wherein R is $C_nX_{2n+1}$, n is 2, X is hydrogen and $R_1$ is methyl.

9. A compound as defined in claim 8 in the form of an addition salt with hydrogen chloride.

References Cited
UNITED STATES PATENTS 3,234,255   2/1966   Hackmann et al. _ _ 260—564 XR
3,334,137   8/1967   Bruderlein _ _ _ _ _ _ _ _ _ _ 260—564

OTHER REFERENCES

Eloy et al., Helv. Chim., Acta, vol. 45, pp. 437–440 (1962).

FLOYD D. HIGEL, Primary Examiner

U.S. Cl. X.R.

8—4; 117—127, 138.8, 142, 147, 152; 252—8.8, 380; 260—37, 89.7, 501.14, 562